United States Patent
Okuda (10) Patent No.: US 11,056,713 B2
(45) Date of Patent: Jul. 6, 2021

(54) LITHIUM ION SECONDARY BATTERY AND METHOD OF MANUFACTURING SAME

(71) Applicant: TOYOTA JIDOSHA KABUSHIKI KAISHA, Toyota (JP)

(72) Inventor: Koji Okuda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 189 days.

(21) Appl. No.: 15/934,408

(22) Filed: Mar. 23, 2018

(65) Prior Publication Data
US 2018/0287201 A1    Oct. 4, 2018

(30) Foreign Application Priority Data
Apr. 3, 2017    (JP) .................................. 2017-073628

(51) Int. Cl.
*H01M 10/0525* (2010.01)
*H01M 10/0569* (2010.01)
(Continued)

(52) U.S. Cl.
CPC ....... *H01M 10/0525* (2013.01); *H01M 4/133* (2013.01); *H01M 4/134* (2013.01); *H01M 4/485* (2013.01); *H01M 4/622* (2013.01); *H01M 4/623* (2013.01); *H01M 4/662* (2013.01); *H01M 10/0568* (2013.01); *H01M 10/0569* (2013.01); *H01M 50/409* (2021.01); *H01M 50/463* (2021.01); *H01M 2004/027* (2013.01);
(Continued)

(58) Field of Classification Search
CPC .. H01M 4/485; H01M 4/622; H01M 10/0568; H01M 2300/0028; H01M 10/0525; H01M 10/0569; H01M 4/662; H01M 4/134; H01M 2004/027; H01M 2/16; H01M 2/18; H01M 4/623; H01M 2004/028; H01M 4/133
USPC .............................................. 429/218, 218.1
See application file for complete search history.

(56) References Cited

U.S. PATENT DOCUMENTS

2005/0202316 A1    9/2005    Hwang et al.
2010/0028768 A1*   2/2010    Morita .................. H01M 4/485
                                                           429/144
(Continued)

FOREIGN PATENT DOCUMENTS

CN    102820484 A    12/2012
CN    105830272 A    8/2016
(Continued)

*Primary Examiner* — Jonathan G Jelsma
*Assistant Examiner* — Omar M Kekia
(74) *Attorney, Agent, or Firm* — Oliff PLC (57) ABSTRACT

A lithium ion secondary battery at least includes a positive electrode, a negative electrode, and an electrolyte solution. The positive electrode at least includes a positive electrode active material and a binder. The positive electrode active material includes more than or equal to 0.08 mass % of a lithium carbonate and a remainder of a lithium complex oxide. The binder is at least one selected from a group consisting of polytetrafluoroethylene, polyethylene oxide, and carboxymethylcellulose. The electrolyte solution at least includes a solvent and a lithium salt. The solvent is at least one of N,N-dimethylformamide and dimethylacetamide. A concentration of the lithium salt in the electrolyte solution is more than or equal to 1.9 mol/l and less than or equal to 2.3 mol/l.

16 Claims, 6 Drawing Sheets

(51) Int. Cl.
| | |
|---|---|
| *H01M 4/133* | (2010.01) |
| *H01M 4/134* | (2010.01) |
| *H01M 4/62* | (2006.01) |
| *H01M 4/66* | (2006.01) |
| *H01M 10/0568* | (2010.01) |
| *H01M 4/485* | (2010.01) |
| *H01M 50/409* | (2021.01) |
| *H01M 50/463* | (2021.01) |
| *H01M 4/02* | (2006.01) |

(52) U.S. Cl.
CPC ............... *H01M 2004/028* (2013.01); *H01M 2300/0028* (2013.01)

(56) References Cited

U.S. PATENT DOCUMENTS

| | | | | |
|---|---|---|---|---|
| 2011/0039160 | A1* | 2/2011 | Takahata | H01M 10/4235 429/231.1 |
| 2012/0176089 | A1 | 7/2012 | Hwang et al. | |
| 2012/0313570 | A1* | 12/2012 | Ohtaniuchi | H01M 10/0525 320/103 |
| 2013/0089777 | A1* | 4/2013 | Tatsumi | C01B 25/10 429/199 |
| 2013/0130113 | A1* | 5/2013 | Takano | H01M 4/131 429/223 |
| 2014/0255781 | A1* | 9/2014 | Son | H01M 4/366 429/215 |
| 2016/0294008 | A1* | 10/2016 | Yoshida | C07C 303/28 |
| 2017/0187031 | A1 | 6/2017 | Kurita et al. | |

FOREIGN PATENT DOCUMENTS

| | | |
|---|---|---|
| EP | 0999604 A1 | 5/2000 |
| JP | S63-032873 A | 2/1988 |
| JP | S64-059781 A | 3/1989 |
| JP | 2000-133307 A | 5/2000 |
| JP | 2000-149952 A | 5/2000 |
| JP | 2004-335345 A | 11/2004 |
| JP | 2009-004311 A | 1/2009 |
| JP | 2010-278014 A | 12/2010 |
| KR | 10-2015-0099521 A | 8/2015 |
| KR | 10-2017-0009876 A | 1/2017 |

* cited by examiner

LITHIUM ION SECONDARY BATTERY AND METHOD OF MANUFACTURING SAME

This nonprovisional application is based on Japanese Patent Application No. 2017-073628 filed on Apr. 3, 2017 with the Japan Patent Office, the entire contents of which are hereby incorporated by reference.

BACKGROUND

Field

The present disclosure relates to a lithium ion secondary battery and a method of manufacturing the lithium ion secondary battery.

Description of the Background Art

Japanese Patent Laying-Open No. 2000-133307 discloses a polyvalent metal cation secondary battery in which an electrolyte solvent is an amide-based solvent.

SUMMARY

An electrolyte solution including an amide-based solvent (such as N,N-dimethylformamide) can have a high electric conductivity. This is presumably because the amide-based solvent has a high polarity and a low viscosity. With the high electric conductivity of the electrolyte solution, an input/output characteristic of a battery is expected to be improved. However, the amide-based solvent has a low oxidation potential (i.e., a narrow potential window). Hence, a battery system in which such an amide-based solvent can be used is limited.

In Japanese Patent Laying-Open No. 2000-133307, an amide-based solvent is used for an electrolyte solution of the polyvalent metal cation secondary battery (such as a magnesium ion secondary battery). The polyvalent metal such as magnesium (Mg) has a standard electrode potential higher than that of lithium (Li). Hence, the polyvalent metal cation secondary battery can be constructed in the potential window of the amide-based solvent.

Li has the lowest standard electrode potential. Therefore, the lithium ion secondary battery can have a high voltage. It is considered difficult to construct a practically usable lithium ion secondary battery in the potential window of the amide-based solvent.

An object of the present disclosure is to provide a lithium ion secondary battery in which an electrolyte solvent is an amide-based solvent.

Hereinafter, the technical configuration, function and effect of the present disclosure will be described. However, a mechanism of the function of the present disclosure includes presumption. The scope of claims should not be limited depending on whether the mechanism of the function is correct or incorrect.

[1] A lithium ion secondary battery at least includes a positive electrode, a negative electrode, and an electrolyte solution. The positive electrode at least includes a positive electrode active material and a binder. The positive electrode active material includes more than or equal to 0.08 mass % of a lithium carbonate and a remainder of a lithium complex oxide. The binder is at least one selected from a group consisting of polytetrafluoroethylene, polyethylene oxide, and carboxymethylcellulose. The electrolyte solution at least includes a solvent and a lithium salt. The solvent is at least one of N,N-dimethylformamide and dimethylacetamide. A concentration of the lithium salt in the electrolyte solution is more than or equal to 1.9 mol/l and less than or equal to 2.3 mol/l.

Hereinafter, at least one of N,N-dimethylformamide (DMF) and dimethylacetamide (DMA) may be simply referred to as "DMF etc".

When DMF etc. is used for the electrolyte solvent, it is considered that DMF etc. is oxidatively decomposed on a surface of the lithium complex oxide during charging. This is because DMF etc. has a low oxidation potential. Hence, it is difficult to function as a secondary battery. Moreover, conventionally, polyvinylidene fluoride (PVdF) has been commonly used for the binder of the positive electrode. PVdF is dissolved in DMF etc. In the battery, the positive electrode is immersed in the electrolyte solution. It is considered difficult for the positive electrode immersed in DMF etc. to maintain its structure.

In the configuration of [1] above, at least one selected from the group consisting of polytetrafluoroethylene (PTFE), polyethylene oxide (PEO), and carboxymethylcellulose (CMC) is used for the binder of the positive electrode. PTFE, PEO, and CMC are hardly dissolved in DMF etc. Therefore, in the configuration of [1] above, it is considered that the positive electrode can maintain its structure even when the positive electrode is immersed in the electrolyte solution (DMF etc.).

Further, the positive electrode active material includes more than or equal to 0.08 mass % of the lithium carbonate ($Li_2CO_3$; hereinafter also referred to as "Li carbonate"). It is considered that the Li carbonate is adhered to the surface of the lithium complex oxide. Since the Li carbonate protects the surface of the lithium complex oxide, the oxidative decomposition of DMF etc. is considered to be suppressed. When the Li carbonate amount is less than 0.08 mass %, the oxidative decomposition of DMF etc. may not be suppressed sufficiently.

Further, in the configuration of [1] above, the electrolyte solution includes a high concentration of the Li salt. That is, the concentration of the Li salt of the electrolyte solution is more than or equal to 1.9 mol/l and less than or equal to 2.3 mol/l. Accordingly, the oxidative decomposition of DMF etc. can be suppressed. At present, details of this mechanism are unknown. At present, the details of the mechanism are presumed as follows.

Normally, the concentration of the Li salt is about 1.0 mol/l. In this case, it is considered that both DMF etc. in solvation with Li ions and DMF etc. not in solvation with Li ions exist in the electrolyte solution. With the high concentration of the Li salt, the DMF etc. not in the solvation is decreased and most DMF etc. are in the solvation with the Li ions. Accordingly, it is considered that a special solution structure is formed as a whole of the electrolyte solution. As a result, it is considered that the oxidation resistance of the whole of the electrolyte solution is improved.

With synergy of the functions above, the oxidative decomposition of DMF etc. can be suppressed even in a high potential environment within the lithium ion secondary battery. That is, there can be provided a lithium ion secondary battery in which an electrolyte solvent is DMF etc.

[2] The positive electrode active material may include more than or equal to 0.10 mass % of the lithium carbonate and a remainder of the lithium complex oxide. Accordingly, it is expected to increase the effect of suppressing the oxidative decomposition of DMF etc.

[3] The lithium complex oxide may have a lamellar rock salt type structure. A surface of the lithium complex oxide having the lamellar rock salt type structure tends to be appropriately deactivated when the lithium complex oxide has been in a water-based paste. Since the surface of the lithium complex oxide is deactivated, it is expected to increase the effect of suppressing the oxidative decomposition of DMF etc.

[4] The electrolyte solution may have an electric conductivity of more than or equal to 9.73 mS/cm and less than or equal to 19.84 mS/cm. The electrolyte solution in which the solvent is DMF and which includes a high concentration of the Li salt can have a high electric conductivity of more than or equal to 9.73 mS/cm and less than or equal to 19.84 mS/cm.

[5] A method of manufacturing a lithium ion secondary battery includes (a1) to (a3), (B), (C) and (D) as follows.

(a1) A positive electrode active material is prepared by exposing a lithium complex oxide to carbon dioxide.

(a2) A positive electrode paste is prepared by at least mixing the positive electrode active material, a binder, and water.

(a3) A positive electrode is manufactured by drying the positive electrode paste.

(B) A negative electrode is manufactured.

(C) An electrolyte solution at least including a solvent and a lithium salt is prepared.

(D) A lithium ion secondary battery at least including the positive electrode, the negative electrode, and the electrolyte solution is manufactured.

The positive electrode active material is prepared to include more than or equal to 0.08 mass % of a lithium carbonate and a remainder of the lithium complex oxide.

The binder is at least one selected from a group consisting of polytetrafluoroethylene, polyethylene oxide, and carboxymethylcellulose.

The electrolyte solution is prepared such that the solvent is at least one of N,N-dimethylformamide and dimethylacetamide and a concentration of the lithium salt is more than or equal to 1.9 mol/l and less than or equal to 2.3 mol/l.

In the above-described manufacturing method, the water-based paste is employed for the positive electrode paste. PTFE, PEO, and CMC can be used as an aqueous solution or water-based dispersion. Since the lithium complex oxide has been in the water-based paste, it is considered that the surface of the lithium complex oxide is appropriately deactivated. That is, it is considered that the crystal structure of the surface of the lithium complex oxide is changed into a crystal structure in which oxidative decomposition of DMF etc. is less likely to occur. Conventionally, an organic solvent based paste employing N-methyl-2-pyrrolidone (NMP) or the like has been mainly used for the positive electrode paste, for example. However, in such an organic solvent based paste, it is considered that the crystal structure is unlikely to be changed in the same manner.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment (hereinafter, also referred to as "the present embodiment") of the present disclosure will be described. However, the description below is not intended to limit the scope of claims. In the present specification, the expression "at least one of A and B" is intended to include "only A", "only B", and "both A and B", for example. For ease of description, dimensional relations are appropriately changed in figures of the present disclosure. The dimensional relations in the figures of the present disclosure do not represent actual dimensional relations. In the description below, the lithium ion secondary battery may be simply described as "battery".

<Lithium Ion Secondary Battery>

Figure 1:
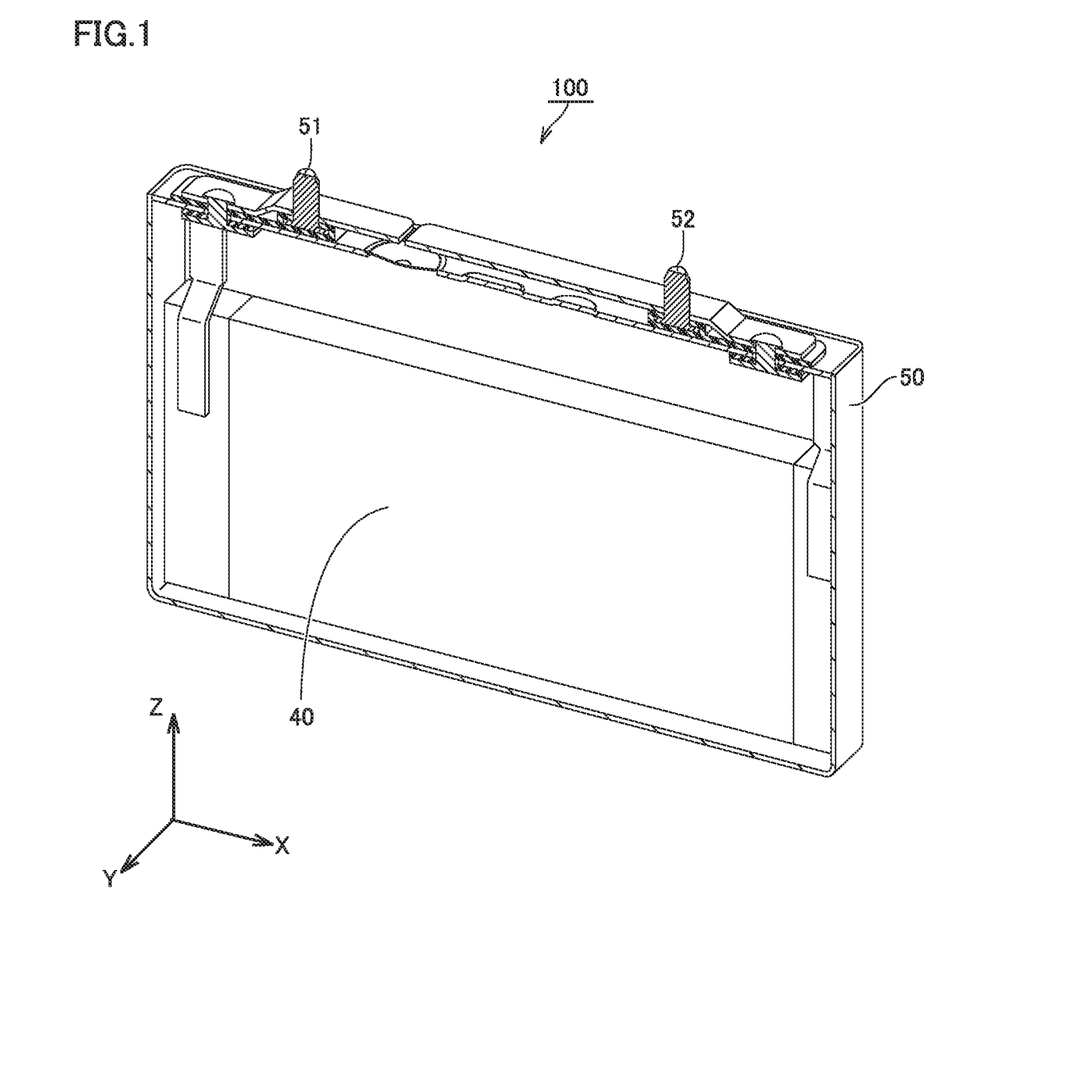
FIG. 1 is a schematic view showing an exemplary configuration of a lithium ion secondary battery according to an embodiment of the present disclosure.

FIG. 1 is a schematic view showing an exemplary configuration of a lithium ion secondary battery according to an embodiment of the present disclosure. A battery 100 includes a case 50. Case 50 has an electrode group 40 and an electrolyte solution (not shown) stored therein.

<<Case>>

Case 50 is sealed. Case 50 can include a container and a cover, for example. Case 50 is composed of an aluminum (Al) alloy, for example. Case 50 has a prismatic shape (flat profile rectangular parallelepiped). However, the case of the present embodiment should not be limited to the prismatic shape. The case may have a cylindrical shape or may be a pouch or the like formed from an aluminum laminate film, for example.

Case 50 has a positive electrode terminal 51 and a negative electrode terminal 52. Positive electrode terminal 51 is electrically connected to a positive electrode 10. Negative electrode terminal 52 is electrically connected to a negative electrode 20. Case 50 may be provided with an injection opening, a current interrupt device (CID), a gas exhaust valve, and the like.

<<Electrode Group>>

Figure 2:
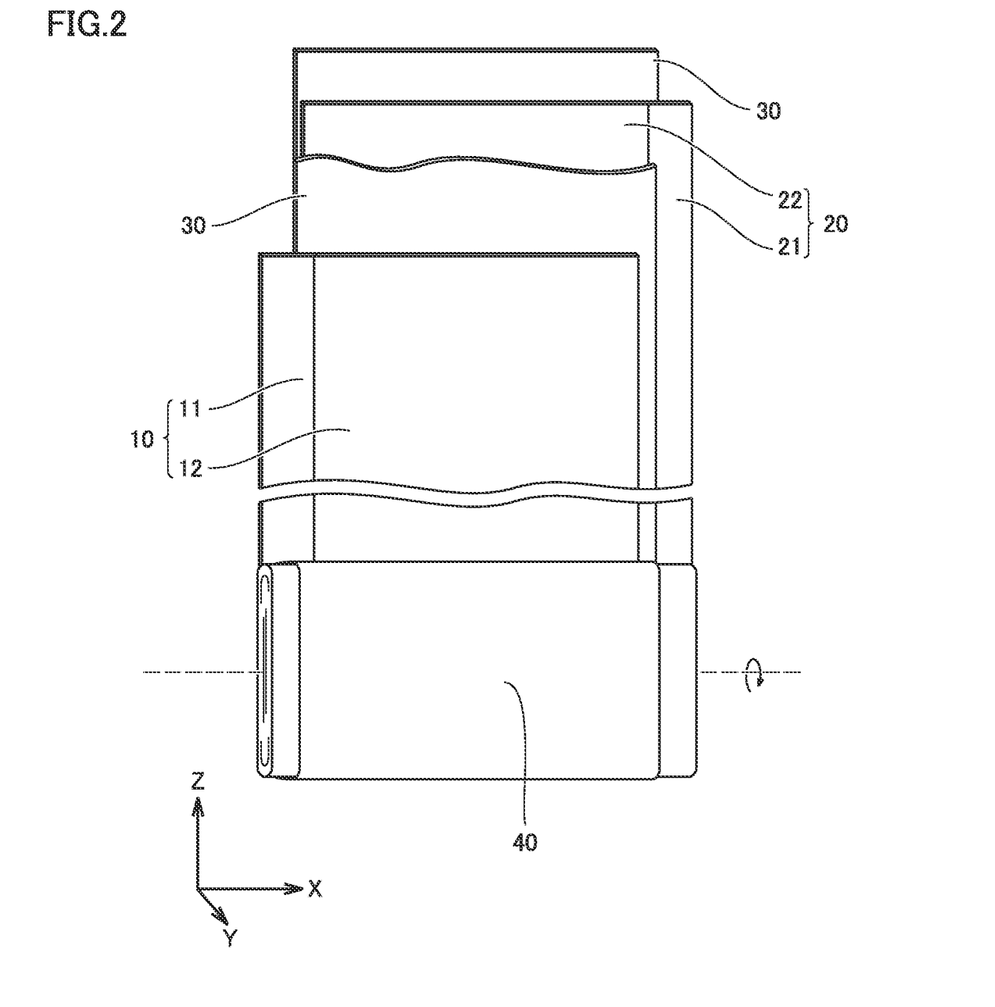
FIG. 2 is a schematic view showing an exemplary configuration of an electrode group.

FIG. 2 is a schematic view showing an exemplary configuration of the electrode group. Electrode group 40 includes positive electrode 10, negative electrode 20, and a separator 30. Therefore, battery 100 at least includes positive electrode 10, negative electrode 20, and an electrolyte solution. Separator 30 is disposed between positive electrode 10 and negative electrode 20. Electrode group 40 is of winding type. That is, electrode group 40 is constructed by disposing positive electrode 10 and negative electrode 20 to face each other with separator 30 being interposed therebetween and by winding them in the form of a spiral. However, the electrode group of the present embodiment should not be limited to the winding type. The electrode group may be of stack type. The stack type electrode group can be constructed by alternately stacking positive and negative electrodes with a separator being interposed therebetween.

<<Separator>>

Separator 30 is in the form of a sheet. Separator 30 is an electrically insulative porous membrane. Separator 30 may have a thickness of 10 to 30 μm, for example. In the present specification, the "thickness" of each configuration can be measured by a micrometer or the like, for example. The thickness of each configuration may be measured in a cross sectional microscopic image of the configuration or the like.

Separator 30 can be composed of polyethylene (PE), polypropylene (PP), or the like, for example. Separator 30 may have a multilayer structure. For example, separator 30 may be constructed by stacking the porous membrane composed of PP, the porous membrane composed of PE, and the porous membrane composed of PP in this order. Separator 30 may include a heat-resistant layer on its surface. The heat-resistant layer can include a heat-resistant material such as alumina, for example. The heat-resistant layer may have a thickness of 0.5 to 5 μm, for example.

<<Positive Electrode>>

Positive electrode 10 is in the form of a sheet. Positive electrode 10 includes a positive electrode collector 11 and a positive electrode composite layer 12. Positive electrode collector 11 may be an Al foil or the like, for example. The Al foil may be a pure Al foil or may be an Al alloy foil. Positive electrode collector 11 may have a thickness of 10 to 30 for example. Positive electrode composite layer 12 is disposed on a surface of positive electrode collector 11. Positive electrode composite layer 12 may be disposed on both front and rear surfaces of positive electrode collector 11. Positive electrode composite layer 12 may have a thickness of 10 to 100 for example.

Positive electrode composite layer 12 includes a positive electrode active material, a conductive material, and a binder. That is, positive electrode 10 at least includes the positive electrode active material and the binder. Positive electrode composite layer 12 can include 80 to 98 mass % of the positive electrode active material, 1 to 15 mass % of the conductive material, and 1 to 5 mass % of the binder, for example.

The positive electrode active material includes more than or equal to 0.08 mass % of a Li carbonate and a remainder of a lithium complex oxide. It is considered that the Li carbonate is adhered to a surface of the lithium complex oxide. A Li carbonate amount is a mass ratio of the Li carbonate to a total of the Li carbonate and the lithium complex oxide. When the Li carbonate amount is more than or equal to 0.08 mass %, oxidative decomposition of DMF etc. can be suppressed. The positive electrode active material may include more than or equal to 0.10 mass % of the Li carbonate and a remainder of the lithium complex oxide. Accordingly, an effect of suppressing the oxidative decomposition is expected to be increased. The Li carbonate amount may be more than or equal to 0.14 mass %, for example. The Li carbonate amount may be less than or equal to 0.20 mass %, for example. When the Li carbonate amount is too large, a storage characteristic or the like may be decreased.

The "Li carbonate amount" can be measured by a thermogravimetry-mass spectrometry (TG-MS) method or the like, for example. A sample amount is set at about 0.3 to 1 g, for example. A measurement temperature range is set at 20 to 1000° C., for example. By heating the positive electrode active material, $Li_2CO_3$ is decomposed to emit $CO_2$. A total mass of $CO_2$ emitted until the temperature reaches 1000° C. is measured. The total mass of $CO_2$ is converted into a total mass of $Li_2CO_3$. The total mass of $Li_2CO_3$ is divided by the mass of the positive electrode active material before the heating, thereby determining the Li carbonate amount. The Li carbonate amount is measured at least 3 times. An arithmetical average of the Li carbonate amounts determined at least 3 times are employed.

The lithium complex oxide can have a mass ratio of more than or equal to 99.80 mass % and less than or equal to 99.92 mass % with respect to the positive electrode active material (total of the lithium complex oxide and the Li carbonate), for example. The lithium complex oxide represents a complex oxide of Li and an element other than Li. The lithium complex oxide can electrochemically occlude Li ions and can emit them.

The lithium complex oxide can be particles. The lithium complex oxide may be secondary particles, in each of which primary particles are gathered. The secondary particles may have an average particle size of 1 to 30 μm, for example. It is assumed that the "average particle size" in the present specification represents the size of particles at an integrated value of 50% from the finest particle in volume-based particle size distribution measured by a laser diffraction-scattering method.

The lithium complex oxide should not be limited in particular. The lithium complex oxide may be $LiCoO_2$, $LiMnO_2$, $LiNiO_2$, $LiMn_2O_4$, $LiFePO_4$, or the like, for example. One type of lithium complex oxide may be used solely or two or more types of lithium complex oxides may be used in combination. However, battery 100 of the present embodiment is desirably configured to have a positive electrode potential of less than or equal to 4.2 V (vs.Li/Li$^+$) in a fully charged state. This is to suppress oxidative decomposition of DMF etc. Here, "vs.Li/Li$^+$" indicates a potential that is based on the standard electrode potential of Li. In view of an energy density, battery 100 of the present embodiment may be configured such that the positive electrode potential in the fully charged state becomes more than or equal to 3.5 V (vs.Li/Li$^+$), or becomes more than or equal to 3.8 V (vs.Li/Li$^+$), or becomes more than or equal to 4.0 V (vs.Li/Li$^+$).

The lithium complex oxide desirably has a plateau region at a comparatively low potential. The term "plateau region" indicates a region in which a charge/discharge curve becomes flat. If the plateau region is at a high potential, sufficient Li ions may be unable to be used with the charging to 4.2 V (vs.Li/Li$^+$). In view of the plateau region, the lithium complex oxide may be at least one of $LiFePO_4$ and a ternary lithium complex oxide.

The ternary lithium complex oxide includes the following three elements: nickel (Ni), cobalt (Co) and manganese (Mn). Alternatively, the ternary lithium complex oxide includes the following three elements: Ni, Co and Al. The chemical composition of the lithium complex oxide can be specified by an energy dispersive X-ray spectrometry (EDX) method, for example. The ternary lithium complex oxide can be expressed by, for example, the following formula (I):

$$LiNi_xCo_yMe_zO_2 \quad (I)$$

where Me is Mn or Al, and
x, y, and z satisfy 0<x<1, 0<y<1, 0<z<1, and x+y+z=1.

In the above-described formula (I), x, y, and z may satisfy 0.2≤x≤0.4, 0.2≤y≤0.4, 0.2≤z≤0.4, and x+y+z=1, for example.

In the above-described formula (I), x, y, and z may satisfy 0.5≤x≤0.9, 0.09≤y≤0.3, 0.01≤z≤0.2, and x+y+z=1, for example.

In the above-described formula (I), part of Ni, Co, and Me may be replaced with other element(s). An amount of the replacement may be about 0.1 to 1 mol % with respect to a total material amount of Ni, Co, and Me, for example. The other element(s) may be at least one selected from a group consisting of Zr (zirconium), Ti (titanium), Mo (molybdenum), W (tungsten), Mg (magnesium), Ca (calcium), Na (sodium), Fe (iron), Cr (chromium), Zn (zinc), Si (silicon) and Sn (tin), for example.

The ternary lithium complex oxide may be at least one selected from a group consisting of $LiNi_{1/3}Co_{1/3}Mn_{1/3}O_2$, $LiNi_{0.4}Co_{0.3}Mn_{0.3}O_2$, $LiNi_{0.3}Co_{0.4}Mn_{0.3}O_2$, $LiNi_{0.3}Co_{0.3}Mn_{0.4}O_2$, $LiNi_{0.5}Co_{0.3}Mn_{0.2}O_2$, $LiNi_{0.5}Co_{0.2}Mn_{0.3}O_2$, $LiNi_{0.2}Co_{0.5}Mn_{0.3}O_2$, $LiNi_{0.6}Co_{0.2}Mn_{0.2}O_2$, $LiNi_{0.6}Co_{0.3}Mn_{0.1}O_2$, $LiNi_{0.6}Co_{0.1}Mn_{0.3}O_2$, $LiNi_{0.7}Co_{0.2}Mn_{0.1}O_2$, $LiNi_{0.7}Co_{0.1}Mn_{0.2}O_2$, $LiNi_{0.8}Co_{0.1}Mn_{0.1}O_2$, $LiNi_{0.7}Co_{0.2}Al_{0.1}O_2$, $LiNi_{0.8}Co_{0.1}Al_{0.1}O_2$, and $LiNi_{0.8}Co_{0.15}Al_{0.05}O_2$, for example.

The crystal structure of the lithium complex oxide may be specified by an X-ray diffraction (XRD) method, for example. The lithium complex oxide may have a lamellar rock salt type structure. The lithium complex oxide having the lamellar rock salt type structure tends to be appropriately deactivated when the lithium complex oxide has been in a water-based paste. This is presumably because the lamellar rock salt type structure has a structure that facilitates Li ions to be eluted. Since the surface of the lithium complex oxide is deactivated, it is expected to increase the effect of suppressing oxidative decomposition of DMF etc. For example, the ternary lithium complex oxide expressed by the above-described formula (I) may have the lamellar rock salt type structure. However, the lithium complex oxide may have a crystal structure other than the lamellar rock salt type structure. For example, the lithium complex oxide may have a spinel type structure, an olivine type structure, or the like.

The positive electrode active material may include an impurity inevitably mixed during manufacturing, for example. Examples of such an impurity include a sulfur compound and the like. An amount of the impurity can be less than or equal to 0.03 mass %, for example. The amount of the impurity can be measured by an inductively coupled plasma (ICP) emission spectrometry, for example.

The conductive material should not be limited in particular. Examples of the conductive material may include acetylene black, thermal black, furnace black, vapor-grown carbon fiber (VGCF), graphite, and the like. One type of conductive material may be used solely or two or more types of conductive materials may be used in combination. The binder is at least one selected from a group consisting of PTFE, PEO, and CMC. These binders may have resistance against DMF etc.

<<Negative Electrode>>

Negative electrode 20 is in the form of a sheet. Negative electrode 20 includes a negative electrode collector 21 and a negative electrode composite material layer 22. Negative electrode collector 21 may be a copper (Cu) foil or the like, for example. The Cu foil may be a pure Cu foil or may be a Cu alloy foil. Negative electrode collector 21 may have a thickness of 5 to 30 μm, for example. Negative electrode composite material layer 22 is disposed on a surface of negative electrode collector 21. Negative electrode composite material layer 22 may be disposed on both front and rear surfaces of negative electrode collector 21. Negative electrode composite material layer 22 may have a thickness of 10 to 100 μm, for example.

Negative electrode composite material layer 22 includes a negative electrode active material and a binder. Negative electrode composite material layer 22 includes 90 to 99.5 mass % of the negative electrode active material, and 0.5 to 10 mass % of the binder, for example. The negative electrode active material can electrochemically occlude Li ions and can emit them. The negative electrode active material may be particles. The negative electrode active material may have an average particle size of 1 to 30 μm, for example.

The negative electrode active material should not be limited in particular. Examples of the negative electrode active material may include graphite, soft carbon, hard carbon, silicon, silicon oxide, tin, tin oxide, and the like. One type of negative electrode active material may be used solely or two or more types of negative electrode active materials may be used in combination. For example, there may be used a material in which graphite is coated with amorphous carbon. Examples of the binder may include CMC, polyacrylate (PAA), styrene butadiene rubber (SBR), and the like. One type of binder may be used solely or two or more types of binders may be used in combination.

<<Electrolyte Solution>>

The electrolyte solution at least includes a solvent and a Li salt. The solvent is at least one of DMF and DMA. The composition of the solvent can be specified by a nuclear magnetic resonance (NMR) method, a gas chromatography mass spectrometry (GC-MS) method, or the like, for example. The solvent may be a single solvent of DMF. When the solvent is the single solvent of DMF, the input/output characteristic are expected to be improved. It should be noted that the solvent may be a single solvent of DMA or may be a mixed solvent of DMF and DMA. When the solvent is the mixed solvent of DMF and DMA, a mixture ratio thereof should not be limited in particular. The mixture ratio may be "DMF:DMA=1:9 to 9:1" in volume ratio, for example.

The Li salt is dissolved in the solvent. The electrolyte solution of the present embodiment includes a high concentration of the Li salt. Specifically, the concentration of the Li salt in the electrolyte solution is more than or equal to 1.9 mol/l and less than or equal to 2.3 mol/l. Accordingly, oxidative decomposition of DMF etc. can be suppressed. The concentration of the Li salt can be measured by the NMR method or the like, for example. When the concentration of the Li salt is more than 2.3 mol/l, the input/output characteristic may be decreased. When the concentration of the Li salt is less than 1.9 mol/l, the oxidative decomposition of DMF becomes active, with the result that it may become difficult to perform charging.

The Li salt should not be limited in particular. Examples of the Li salt may include $LiPF_6$, $LiBF_4$, $Li[N(FSO_2)_2]$, $Li[N(CF_3SO_2)_2]$, and the like. One type of Li salt may be used solely or two or more types of Li salts may be used in combination.

The electrolyte solution including the solvent and the Li salt can have a high electric conductivity. The electric conductivity can be measured by a general electric conductivity meter. The electrolyte solution may have an electric conductivity of more than or equal to 9.73 mS/cm and less than or equal to 19.84 mS/cm, for example. The electrolyte solution may have an electric conductivity of more than or equal to 15.93 mS/cm and less than or equal to 19.84 mS/cm, for example.

The electrolyte solution may include other component(s) as long as the electrolyte solution includes the solvent and the Li salt. As the other component(s), various types of functional additive agents can be considered. The electrolyte solution may include 0.1 to 10 mass % of the functional additive agent, for example. Examples of the functional additive agent include a gas generating agent (overcharging additive agent), a coating forming agent, and the like. Examples of the gas generating agent include cyclohexylbenzene (CHB), biphenyl (BP), and the like. Examples of the coating forming agent include vinylene carbonate (VC), vinyl ethylene carbonate (VEC), $Li[B(C_2O_4)_2]$, $LiPO_2F_2$, propane sultone (PS), ethylene sulfite (ES), and the like. One type of functional additive agent may be used solely or two or more types of functional additive agents may be used in combination.

<Method of Manufacturing Lithium Ion Secondary Battery>

Figure 3:
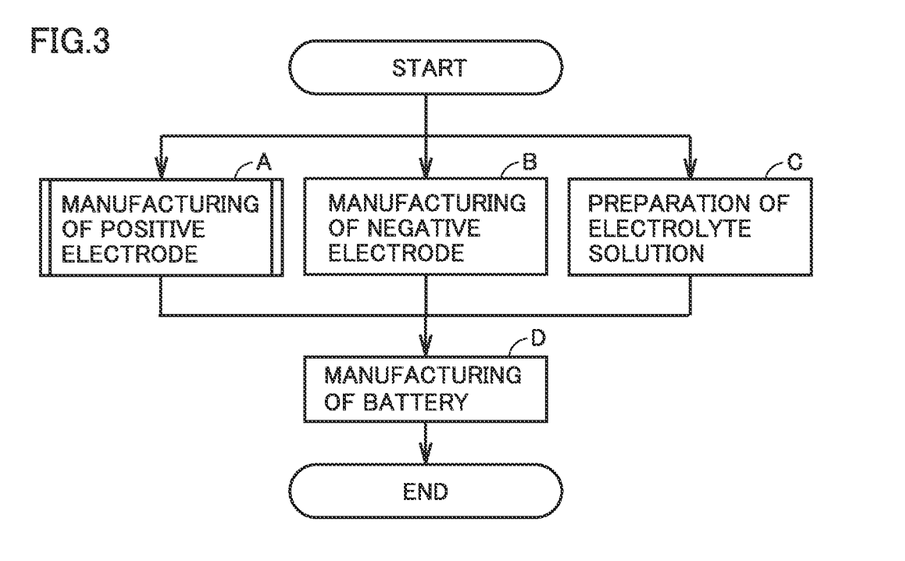
FIG. 3 is a flowchart schematically showing a method of manufacturing the lithium ion secondary battery according to the embodiment of the present disclosure.

FIG. 3 is a flowchart schematically showing a method of manufacturing the lithium ion secondary battery according to the embodiment of the present disclosure. The manufacturing method in the present embodiment includes "(A) manufacturing of the positive electrode", "(B) manufacturing of the negative electrode", "(C) preparation of the electrolyte solution", and "(D) manufacturing of the battery". "(A) manufacturing of the positive electrode", "(B) manufacturing of the negative electrode", and "(C) preparation of the electrolyte solution" may be performed in any order. Hereinafter, the manufacturing method in the present embodiment will be described.

<<(A) Manufacturing of Positive Electrode>>

Figure 4:
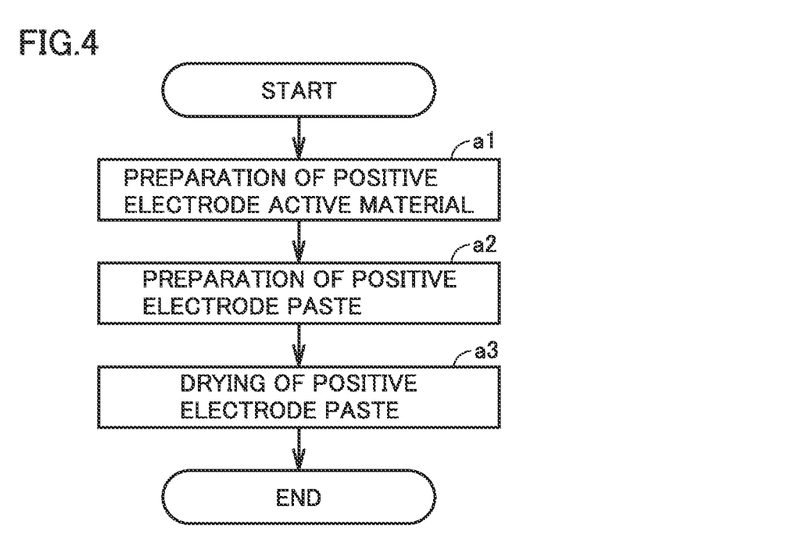
FIG. 4 is a flowchart schematically showing manufacturing of a positive electrode.

FIG. 4 is a flowchart schematically showing the manufacturing of the positive electrode. "(A) manufacturing of the positive electrode" includes "(a1) preparation of the positive electrode active material", "(a2) preparation of a positive electrode paste", and "(a3) drying of a positive electrode paste". Therefore, the manufacturing method of the present embodiment includes these.

<<(a1) Preparation of Positive Electrode Active Material>>

The manufacturing method of the present embodiment includes preparing the positive electrode active material by exposing the lithium complex oxide to $CO_2$. The positive electrode active material is prepared to include more than or equal to 0.08 mass % of the Li carbonate and a remainder of the lithium complex oxide.

First, lithium complex oxide powder is prepared. The lithium complex oxide may be synthesized or may be purchased. Next, the lithium complex oxide is exposed to $CO_2$. For example, the lithium complex oxide may be exposed to atmospheric air. Accordingly, the lithium complex oxide is exposed to $CO_2$ in the atmospheric air. Alternatively, the lithium complex oxide may be placed in a predetermined chamber, and a gas with an adjusted $CO_2$ concentration may be introduced into this chamber. The lithium complex oxide is exposed to $CO_2$ to obtain a Li carbonate amount of more than or equal to 0.08 mass %. For example, it can be considered that the lithium complex oxide is exposed to atmospheric air while measuring the Li carbonate amount whenever a predetermined time passes.

<<(a2) Preparation of Positive Electrode Paste>>

The manufacturing method of the present embodiment includes preparing the positive electrode paste by at least mixing the positive electrode active material, the binder, and water. Since the lithium complex oxide has been in the water-based paste, it is considered that the surface of the lithium complex oxide is appropriately deactivated. That is, it is considered that the crystal structure of the surface of the lithium complex oxide is changed into a crystal structure in which oxidative decomposition of DMF etc. is less likely to occur. The positive electrode paste may be prepared by mixing the positive electrode active material, a conductive material, the binder, and water.

The binder has resistance against DMF etc. That is, the binder is at least one selected from a group consisting of PTFE, PEO, and CMC. For example, an aqueous solution of PEO and CMC may be used. For example, a water-based dispersion of PTFE may be used.

In view of flowability of the positive electrode paste and adhesiveness of the positive electrode composite layer, it is desirable to use both PEO and CMC. When both PEO and CMC are used, a mass ratio thereof can be set, for example, as follows: "PEO:CMC=1:1". A total of PEO and CMC can be 2 to 2.8 mass % with respect to the solid content (total of the positive electrode active material, the conductive material, and the binder), for example.

For the mixing, a general agitator can be used. Using the agitator, the positive electrode active material, the binder, and the water are mixed. An organic solvent mixed with water may be used as long as water is used. That is, a water-based solvent may be used. Examples of the organic solvent mixed with water include ethanol, isopropyl alcohol, acetone, tetrahydrofuran, and the like. The solid content ratio of the positive electrode paste is set at 40 to 60 mass %, for example. The solid content ratio indicates a mass ratio of the components other than the solvent.

<<(a3) Drying of Positive Electrode Paste>>

The manufacturing method of the present embodiment includes manufacturing the positive electrode by drying the positive electrode paste. For example, the positive electrode paste can be applied to a surface of positive electrode collector 11 by a die coater. By drying the positive electrode paste, positive electrode composite layer 12 can be formed. Accordingly, positive electrode 10 can be manufactured. Positive electrode composite layer 12 may be rolled into a predetermined thickness. Positive electrode 10 may be cut into a predetermined shape (for example, a shape of strip or the like) for use.

<<(B) Manufacturing of Negative Electrode>>

The manufacturing method of the present embodiment includes manufacturing the negative electrode. A method of manufacturing the negative electrode should not be limited in particular. The negative electrode can be manufactured by a conventionally known method. For example, by mixing the negative electrode active material, the binder, and the solvent, a negative electrode paste can be prepared. The negative electrode paste can be applied to a surface of negative electrode collector 21 by a die coater. By drying the negative electrode paste, negative electrode composite material layer 22 can be formed. Accordingly, negative electrode 20 can be manufactured. Negative electrode composite material layer 22 may be rolled into a predetermined thickness. Negative electrode 20 may be cut into a predetermined shape for use.

<<(C) Preparation of Electrolyte Solution>>

The manufacturing method of the present embodiment includes preparing the electrolyte solution at least including the solvent and the Li salt. The electrolyte solution is prepared by dissolving the Li salt in the solvent. The solvent is at least one of DMF and DMA. The concentration of the Li salt is set at more than or equal to 1.9 mol/l and less than or equal to 2.3 mol/l.

<<(D) Manufacturing of Battery>>

The manufacturing method of the present embodiment includes manufacturing the lithium ion secondary battery at least including the positive electrode, the negative electrode, and the electrolyte solution.

First, electrode group 40 can be manufactured. Predetermined separator 30 is prepared. Positive electrode 10 and negative electrode 20 are disposed to face each other with separator 30 being interposed therebetween. Positive electrode 10, separator 30, and negative electrode 20 are spirally wound. Accordingly, electrode group 40 can be manufactured. After the winding, electrode group 40 may be shaped into a flat shape.

Predetermined case 50 is prepared. Electrode group 40 is stored in case 50. Positive electrode 10 is electrically connected to positive electrode terminal 51. Negative electrode 20 is electrically connected to negative electrode terminal 52. A predetermined amount of the electrolyte solution is introduced into case 50. Case 50 is sealed. In this way, the lithium ion secondary battery (battery 100) of the present embodiment is manufactured.

<Application and the Like>

As described above, according to the present embodiment, the lithium ion secondary battery in which the electrolyte solvent is the amide-based solvent can be provided. Accordingly, options for the electrolyte solvent are increased to expectedly provide a wide choice of options of techniques.

The lithium ion secondary battery in which the electrolyte solvent is the amide-based solvent is expected to have an excellent input/output characteristic. The lithium ion secondary battery in which the electrolyte solvent is the amide-based solvent is expected to exhibit an excellent input/output characteristic particularly at a low temperature. Therefore, the lithium ion secondary battery of the present embodiment is considered to be suitable for a power supply for motive power in a hybrid vehicle (HV), a plug-in hybrid vehicle (PHV), an electric vehicle (EV), or the like, for example. However, the application of the lithium ion secondary battery of the present embodiment should not be limited to such an application for motive power. The lithium ion secondary battery of the present embodiment is applicable to any application.

Examples

Hereinafter, examples will be described. The examples below, however, do not limit the scope of claims.

Samples No. 1 to No. 22 were manufactured in manners described below. Samples No. 12, No. 13, and No. 18 to No. 22 are examples of the present disclosure. The other samples are comparative examples.

<Sample No. 1>

1. (A) Manufacturing of Positive Electrode

The following materials were prepared.

Positive electrode active material:
lithium complex oxide (LiNi$_{1/3}$Co$_{1/3}$Mn$_{1/3}$O$_2$)
Li carbonate amount (0.01 mass %)
Conductive material: acetylene black
Binder: PVdF
Solvent: NMP
Positive electrode collector: Al foil LiNi$_{1/3}$Co$_{1/3}$Mn$_{1/3}$O$_2$ has a lamellar rock salt type structure. Hereinafter, "LiNi$_{1/3}$Co$_{1/3}$Mn$_{1/3}$O$_2$" will be simply referred to as "NCM".

By mixing the positive electrode active material, the conductive material, the binder, and the solvent, a positive electrode paste was prepared. This positive electrode paste is an organic solvent based paste. The solid content composition of the positive electrode paste was as follows: "the positive electrode active material:the conductive material: the binder=91:6:3" in mass ratio. The positive electrode paste was applied onto a surface of the positive electrode collector. The positive electrode paste was dried. In this way, a positive electrode including the positive electrode composite layer and the positive electrode collector was manufactured. The positive electrode composite layer was rolled. The positive electrode was cut into a predetermined shape.

2. (B) Manufacturing of Negative Electrode

The following materials were prepared.

Negative electrode active material: graphite coated with amorphous carbon (tap density: 1.08 g/cm$^3$)
Binder: CMC, SBR
Solvent: water
Negative electrode collector: Cu foil By mixing the negative electrode active material, the binder, and the solvent, a negative electrode paste was prepared. The solid content composition of the negative electrode paste was set as follows: "the negative electrode active material:CMC:SBR=98:1:1" in mass ratio. The negative electrode paste was applied onto a surface of the negative electrode collector. The negative electrode paste was dried. Accordingly, a negative electrode including the negative electrode composite material layer and the negative electrode collector was manufactured. The negative electrode composite material layer was rolled. The density of the negative electrode composite material layer after the rolling was 1.2 g/cm$^3$. The negative electrode was cut into a predetermined size.

3. (C) Preparation of Electrolyte Solution

An electrolyte solution including the following components was prepared. That is, an electrolyte solution at least including a solvent and a Li salt was prepared.

Solvent: [EC:DMC:EMC=1:1:1 (volume ratio)]
Li salt: LiPF$_6$ (0.5 mol/l)

"EC" indicates ethylene carbonate, "DMC" indicates dimethyl carbonate, and "EMC" indicates ethyl methyl carbonate.

4. (D) Manufacturing of Battery

A positive electrode terminal (Al tab) was welded to the positive electrode. A negative electrode terminal (Ni tab) was welded to the negative electrode. A predetermined separator was prepared. The positive electrode and the negative electrode were disposed to face each other with the separator being interposed therebetween. Accordingly, a stack type electrode group was manufactured. As a case, a pouch formed from an aluminum laminate film was prepared. An electrode group was stored in the case. The electrolyte solution was introduced into the case. The case was sealed. In this way, a lithium ion secondary battery (laminate battery) was manufactured. That is, a lithium ion secondary battery at least including the positive electrode, the negative electrode, and the electrolyte solution was manufactured.

When fully charged (when charged to 4.1 V), this lithium ion secondary battery is configured to have a positive electrode potential of about 4.2 V (vs.Li/Li$^+$).

5. Capacity Checking

The battery was interposed between two plates. The two plates were fixed to press the battery with a force of 250 kgf.

The battery was fully charged by the following constant current-constant voltage mode charging (CCCV charging).

Further, the battery was discharged by the following constant current mode discharging (CC discharging). Accordingly, an initial capacity (discharging capacity) of the battery was measured. The initial capacity of the battery was 100 mAh. It should be noted that "1 C" indicates current with which the full charge capacity is discharged in 1 hour.

CCCV charging: CC current=1 C; CV voltage=4.1V; CV charging time=2 hours

CC discharging: CC current=0.3 C; end voltage=3.0V

<Samples No. 2 to No. 4>

As shown in Table 1 below, each of batteries was manufactured in the same manner as in sample No. 1 except that the concentration of the Li salt was changed.

<Sample No. 5>

1-1. (a1) Preparation of Positive Electrode Active Material

A lithium complex oxide (NCM) was exposed to atmospheric air for a predetermined time. That is, the lithium complex oxide is exposed to $CO_2$. After the exposure to the atmospheric air, a Li carbonate amount of the lithium complex oxide was measured. In this way, a positive electrode active material including 0.10 mass % of the Li carbonate and a remainder of the lithium complex oxide were prepared.

1-2. (a2) Preparation of Positive Electrode Paste

A positive electrode paste was prepared in the same manner as in sample No. 1 except that the positive electrode active material prepared above was used.

1-3. (a3) Drying of Positive Electrode Paste

A positive electrode was manufactured in the same manner as in sample No. 1 except that the positive electrode paste prepared above was used. That is, by drying the positive electrode paste, the positive electrode was manufactured.

An electrolyte solution including the following components was prepared.

Solvent: DMF

Li salt: $LiPF_6$ (1.1 mol/l)

Except for the above, sample No. 5 was manufactured in the same manner as in sample No. 1. However, in sample No. 5, the binder (PVdF) of the positive electrode was dissolved in DMF. Accordingly, the battery characteristics thereof were not evaluated.

<Sample No. 6>

The following materials were prepared.

Positive electrode active material: the positive electrode active material prepared in sample No. 5

Conductive material: acetylene black

Binder: PTFE

Solvent: water (ion exchange water)

By mixing the positive electrode active material, the conductive material, the binder, and the solvent, a positive electrode paste was prepared. That is, a positive electrode paste was prepared by at least mixing the positive electrode active material, the binder, and water. This positive electrode paste is a water-based paste. Except for these, a positive electrode was manufactured in the same manner as in sample No. 5. Further, a battery was manufactured in the same manner as in sample No. 5 except that an electrolyte solution in Table 1 below was used.

<Sample No. 7>

A positive electrode was manufactured in the same manner as in sample No. 6. Further, a battery was manufactured in the same manner as in sample No. 6 except that an electrolyte solution in Table 1 below was used.

<Samples No. 8 to No. 16>

Each of batteries was manufactured in the same manner as in sample No. 7 except that an electrolyte solution was prepared to have a Li-salt concentration in Table 1 below.

<Samples No. 17 to No. 20>

Each of batteries was manufactured in the same manner as in sample No. 13 except that a time of exposing the lithium complex oxide to atmospheric air was adjusted to obtain a Li carbonate amount in Table 1 below.

<Sample No. 21>

A battery was manufactured in the same manner as in sample No. 13 except that DMA was used as the electrolyte solvent instead of DMF.

<Sample No. 22>

PEO and CMC were used as the binder instead of PTFE. The solid content composition of the positive electrode paste was set as follows: "the positive electrode active material: the conductive material:the binder=91:6.2:2.8" in mass ratio. Here, the same amounts of PEO and CMC were used. Except for these, a battery was manufactured in the same manner as in sample No. 13.

<Evaluation>

1. Evaluation of Electric Conductivity

The electric conductivity of each of the electrolyte solutions was measured. Results are shown in Table 1 below.

2. Evaluation of Input/Output Characteristic

The charging ratio (state of charge; SOC) of each of the batteries was adjusted to 60%. The battery was placed in a thermostatic chamber set at −10° C. AC impedance was measured in a frequency range of 0.01 to 1 MHz. The results of measurement were plotted in a complex plane having a horizontal axis representing a real number component of the impedance and a vertical axis representing an imaginary component of the impedance. The diameter of an arc drawn on the complex plane was measured. This diameter is understood as charge transfer resistance (Rct). It is considered that Rct also includes chemical reaction resistance. Rct is shown in Table 1 below. It is considered that the input/output characteristic at a low temperature is more excellent as Rct has a smaller value.

3. Evaluation of Storage Characteristic

The SOC of the battery was adjusted to 80%. The battery was stored for 3 days in a thermostatic chamber set at 40° C. As with the "capacity checking" above, the capacity of the battery after the storage was measured. By dividing the capacity of the battery after the storage by the initial capacity of the battery, a capacity maintenance ratio was calculated. The capacity maintenance ratio is shown in Table 1 below. It is considered that in the samples in which the solvents are DMF etc., as the capacity maintenance ratio is higher, the effect of suppressing oxidative decomposition of DMF etc. is exhibited to be larger.

TABLE 1

Sample List

| | Positive Electrode | | | | Electrolyte Solution | | | Battery Characteristics | |
|---|---|---|---|---|---|---|---|---|---|
| | Positive Electrode Active Material | | | | | | | Input/Output Characteristic | Storage Characteristic |
| | Lithium Complex | Li Carbonate Amount | Binder | | | Li-salt Concentration | Electric Conductivity | Rct | Capacity Maintenance Ratio |
| No. | Oxide | [mass %] | Solvent | Type | Solvent Composition | [mol/l] | [mS/cm] | [mΩ] | [%] |
| 1 | NCM | 0.01 | NMP | PVdF | EC:DMC:EMC = 1:1:1 | 0.5 | 7.00 | 580 | 78 |
| 2 | NCM | 0.01 | NMP | PVdF | EC:DMC:EMC = 1:1:1 | 1.0 | 8.16 | 570 | 78 |
| 3 | NCM | 0.01 | NMP | PVdF | EC:DMC:EMC = 1:1:1 | 1.5 | 6.85 | 600 | 78 |
| 4 | NCM | 0.01 | NMP | PVdF | EC:DMC:EMC = 1:1:1 | 2.0 | 4.90 | 760 | 77 |
| 5 | NCM | 0.10 | NMP | PVdF | DMF | 1.1 | 19.84 | — | — |
| 6 | NCM | 0.10 | Water | PTFE | EC:DMC:EMC = 1:1:1 | 1.0 | 8.16 | 620 | 79 |
| 7 | NCM | 0.10 | Water | PTFE | DMF | 0.2 | 8.02 | — | — |
| 8 | NCM | 0.10 | Water | PTFE | DMF | 0.4 | 12.14 | — | — |
| 9 | NCM | 0.10 | Water | PTFE | DMF | 0.7 | 17.59 | — | — |
| 10 | NCM | 0.10 | Water | PTFE | DMF | 1.1 | 19.84 | — | — |
| 11 | NCM | 0.10 | Water | PTFE | DMF | 1.5 | 19.22 | — | — |
| 12 | NCM | 0.10 | Water | PTFE | DMF | 1.9 | 15.93 | 276 | 78 |
| 13 | NCM | 0.10 | Water | PTFE | DMF | 2.3 | 9.73 | 480 | 76 |
| 14 | NCM | 0.10 | Water | PTFE | DMF | 2.8 | 6.37 | 660 | 77 |
| 15 | NCM | 0.10 | Water | PTFE | DMF | 3.2 | 2.13 | 960 | 78 |
| 16 | NCM | 0.10 | Water | PTFE | DMF | 3.8 | 0.85 | 1080 | 79 |
| 17 | NCM | 0.04 | Water | PTFE | DMF | 2.3 | 9.73 | — | — |
| 18 | NCM | 0.08 | Water | PTFE | DMF | 2.3 | 9.73 | 550 | 58 |
| 19 | NCM | 0.14 | Water | PTFE | DMF | 2.3 | 9.73 | 500 | 80 |
| 20 | NCM | 0.20 | Water | PTFE | DMF | 2.3 | 9.73 | 520 | 82 |
| 21 | NCM | 0.10 | Water | PTFE | DMA | 2.3 | 5.32 | 730 | 76 |
| 22 | NCM | 0.10 | Water | PEO + CMC | DMF | 2.3 | 9.73 | 510 | 77 |

<Results>

[EC:DMC:EMC=1:1:1] in sample No. 1 and the like is a conventionally used solvent composition. Hereinafter, the electrolyte solution having this solvent composition will be referred to as "carbonate-based electrolyte solution". Moreover, the electrolyte solution in which the solvent is DMF will be referred to as "DMF-based electrolyte solution".

Figure 5:
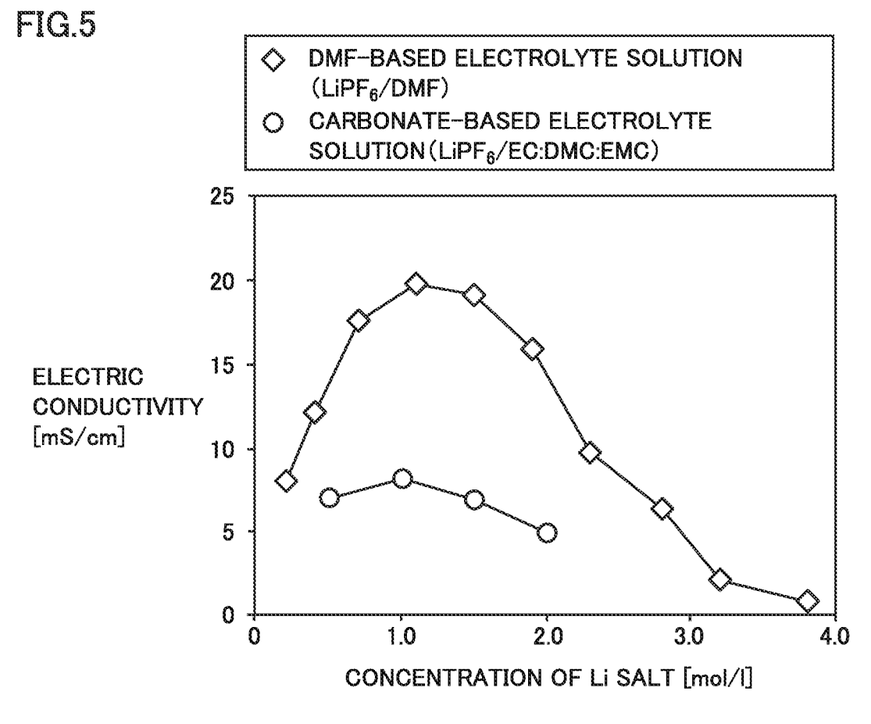
FIG. 5 is a graph showing a relation between a concentration of a Li salt and an electric conductivity of an electrolyte solution.

FIG. 5 is a graph showing a relation between the concentration of the Li salt and the conductivity of the electrolyte solution. The DMF-based electrolyte solution exhibits a higher electric conductivity than that of the carbonate-based electrolyte solution.

Figure 6:
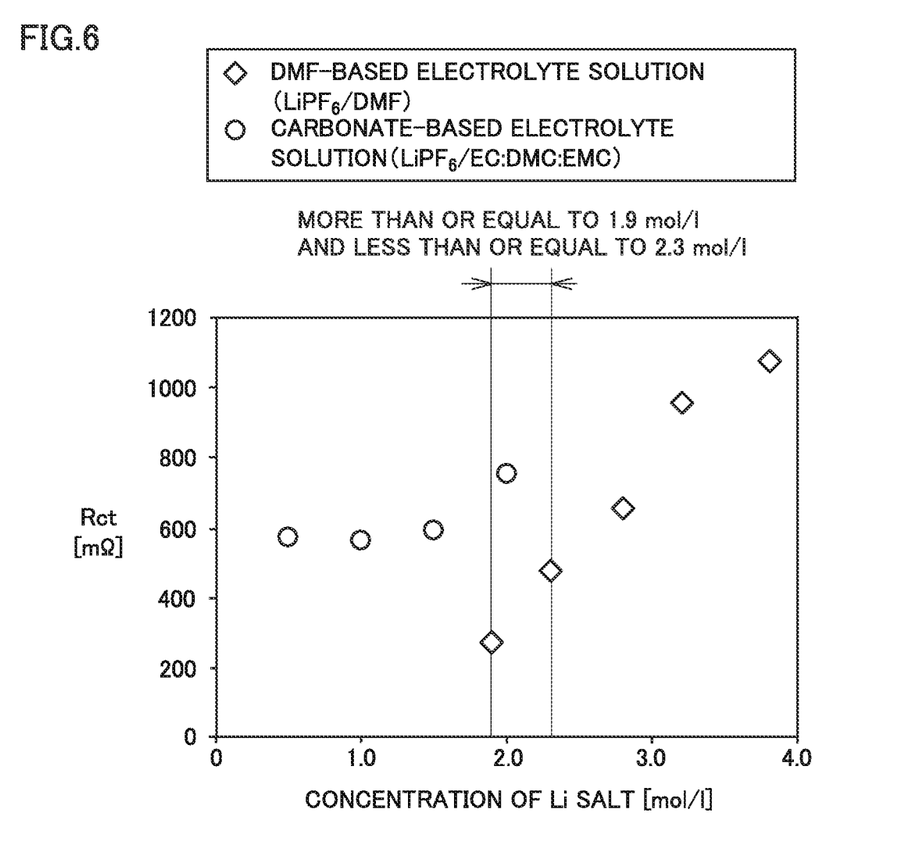
FIG. 6 is a graph showing a relation between the concentration of the Li salt and a charge transfer resistance.

FIG. 6 shows a graph showing a relation between the concentration of the Li salt and the charge transfer resistance. Among the samples employing the DMF-based electrolyte solution, in samples each having a Li salt concentration of less than 1.9 mol/l, voltage was decreased immediately after charging. Hence, Rct could not be measured. Among the samples employing the DMF-based electrolyte solution, samples each having a Li salt concentration of more than or equal to 1.9 mol/l could be charged. Hence, Rct was measured. Each of the samples employing the DMF-based electrolyte solution and having a Li salt concentration of less than or equal to 2.3 mol/l exhibits a Rct lower than that of each of the samples employing the carbonate-based electrolyte solution.

Figure 7:
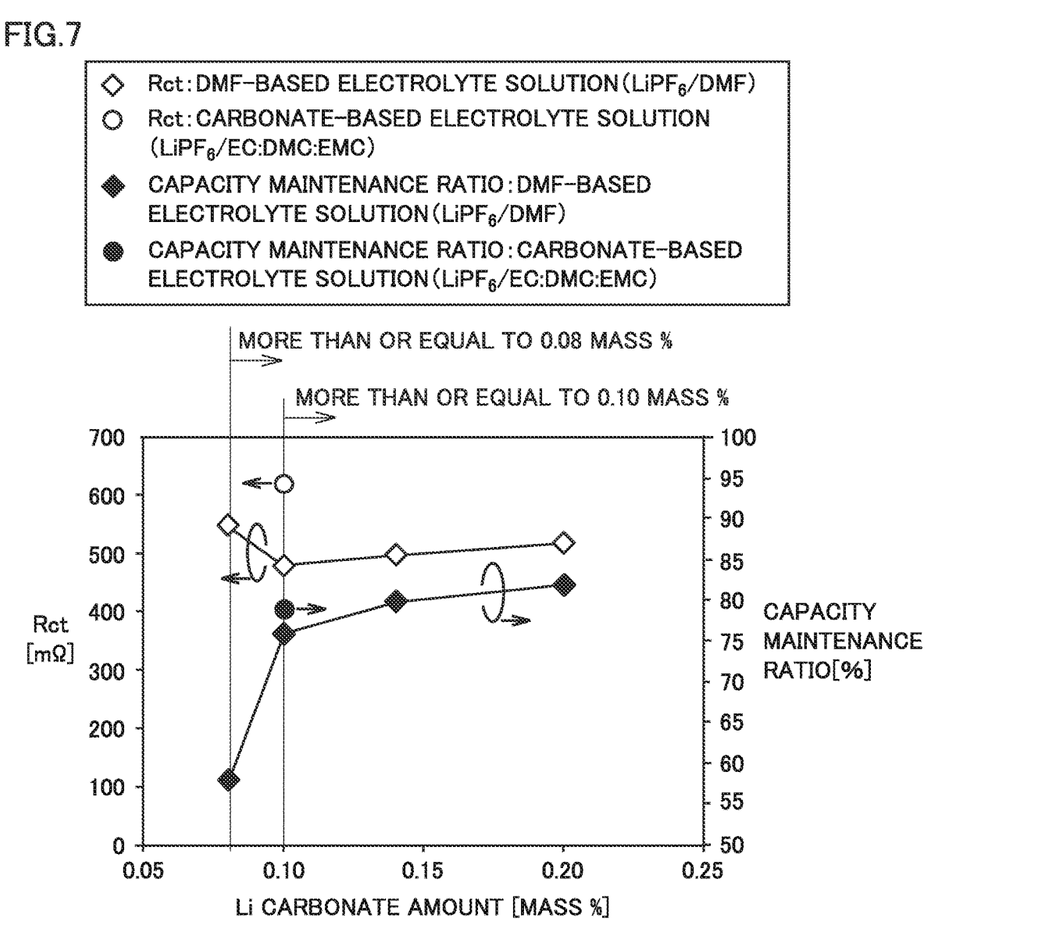
FIG. 7 is a graph showing a relation between a Li carbonate amount and the charge transfer resistance, and a relation between the Li carbonate amount and a capacity maintenance ratio.

FIG. 7 is a graph showing a relation between the Li carbonate amount and the charge transfer resistance, and a relation between the Li carbonate amount and the capacity maintenance ratio. A vertical axis on the left-hand side represents Rct, and a vertical axis on the right-hand side represents the capacity maintenance ratio. Each of the samples employing the DMF-based electrolyte solution and having a Li carbonate amount of more than or equal to 0.08 mass % exhibits a Rct lower than that of each of the samples employing the carbonate-based electrolyte solution.

In sample No. 17 having a Li carbonate amount of less than 0.08 mass %, voltage decrease was drastic and therefore it was difficult to evaluate the battery characteristics. This is presumably because the oxidative decomposition of DMF is not sufficiently suppressed due to shortage of the Li carbonate.

When the Li carbonate amount is more than or equal to 0.10 mass %, the storage characteristic (capacity maintenance ratio) is improved. This is presumably because the effect of suppressing the oxidative decomposition of DMF is increased.

In view of the results of samples No. 13 and No. 21 in Table 1, it is considered that the oxidative decomposition of DMA can be also suppressed when the Li salt concentration is more than or equal to 1.9 mol/l and less than or equal to 2.3 mol/l.

In view of the results of sample No. 13 and No. 22 in Table 1, it is considered that the binder may be at least one selected from a group consisting of PTFE, PEO, and CMC.

The embodiments disclosed herein are illustrative and non-restrictive in any respect. The technical scope defined by the claims is intended to include any modifications within the scope and meaning equivalent to the terms of the claims.

What is claimed is:

1. A lithium ion secondary battery at least comprising a positive electrode, a negative electrode, and an electrolyte solution, the positive electrode at least including a positive electrode active material and a binder, the positive electrode active material including from 0.10 mass % to 0.2 mass % of a lithium carbonate and a remainder of a lithium complex oxide, the binder being at least one selected from a group consisting of polytetrafluoroethylene, polyethylene oxide, and carboxymethylcellulose, the electrolyte solution at least including a solvent and a lithium salt, the solvent being at least one of N,N-dimethylformamide and dimethylacetamide, a concentration of the lithium salt in the electrolyte solution being more than or equal to 1.9 mol/l and less than or equal to 2.3 mol/l.

2. The lithium ion secondary battery according to claim 1, wherein the lithium complex oxide has a lamellar rock salt type structure.

3. The lithium ion secondary battery according to claim 1, wherein the electrolyte solution has an electric conductivity of more than or equal to 9.73 mS/cm and less than or equal to 19.84 mS/cm.

4. The lithium ion secondary battery according to claim 1, wherein the lithium complex oxide has the following formula (I):

$$\text{LiNi}_x\text{Co}_y\text{Me}_z\text{O}_2 \tag{I}$$

where Me is Mn or Al, and x, y, and z satisfy $0<x<1$, $0<y<1$, $0<z<1$, and $x+y+z=1$.

5. The lithium ion secondary battery according to claim 4, wherein x, y, and z satisfy $0.2 \leq x \leq 0.4$, $0.2 \leq y \leq 0.4$, $0.2 \leq z \leq 0.4$.

6. The lithium ion secondary battery according to claim 4, wherein x, y, and z satisfy $0.5 \leq x \leq 0.9$, $0.09 \leq y \leq 0.3$, $0.01 \leq z \leq 0.2$.

7. The lithium ion secondary battery according to claim 1, wherein the positive electrode active material includes from 0.14 mass % to 0.2 mass % of the lithium carbonate and a remainder of the lithium complex oxide.

8. The lithium ion secondary battery according to claim 1, wherein the lithium complex oxide is in the form of secondary particles having an average particle size of 1 to 30 μm.

9. The lithium ion secondary battery according to claim 1, wherein the lithium complex oxide is at least one of $\text{LiFePO}_4$ and a ternary lithium complex oxide.

10. The lithium ion secondary battery according to claim 1, wherein the electrolyte solution has an electric conductivity of more than or equal to 15.93 mS/cm and less than or equal to 19.84 mS/cm.

11. The lithium ion secondary battery according to claim 1, wherein the binder is at least polytetrafluoroethylene.

12. The lithium ion secondary battery according to claim 1, wherein the binder is at least polyethylene oxide.

13. The lithium ion secondary battery according to claim 1, wherein the binder is at least carboxymethylcellulose.

14. The lithium ion secondary battery according to claim 1, wherein the solvent is at least N,N-dimethylformamide.

15. The lithium ion secondary battery according to claim 1, wherein the solvent is at least dimethylacetamide.

16. A method of manufacturing a lithium ion secondary battery, the method comprising:

preparing a positive electrode active material by exposing a lithium complex oxide to carbon dioxide;

preparing a positive electrode paste by at least mixing the positive electrode active material, a binder, and water;

manufacturing a positive electrode by drying the positive electrode paste;

manufacturing a negative electrode;

preparing an electrolyte solution at least including a solvent and a lithium salt; and manufacturing a lithium ion secondary battery at least including the positive electrode, the negative electrode, and the electrolyte solution, the positive electrode active material being prepared to include from 0.10 mass % to 0.2 mass % of a lithium carbonate and a remainder of the lithium complex oxide, the binder being at least one selected from a group consisting of polytetrafluoroethylene, polyethylene oxide, and carboxymethylcellulose, the electrolyte solution being prepared such that the solvent is at least one of N,N-dimethylformamide and dimethylacetamide and a concentration of the lithium salt is more than or equal to 1.9 mol/l and less than or equal to 2.3 mol/l.

* * * * *